Patented Feb. 4, 1941

2,230,587

UNITED STATES PATENT OFFICE 2,230,587

DISULPHONIUM COMPOUNDS OF HIGH MOLECULAR WEIGHT

August Chwala, Vienna, and Edmund Waldmann, Klosterneuburg-on-the-Danube, Germany, assignors to General Aniline & Film Corporation, a corporation of Delaware No Drawing. Application July 29, 1938, Serial No. 221,970. In Austria June 6, 1935

2 Claims. (Cl. 260—607)

Our U. S. application Serial No. 83,160, filed June 2, 1936, relates to sulphonium compounds of high molecular weight.

Our present invention is a continuation in part of the said application and relates to disulphonium compounds of high molecular weight, more particularly to disulphonium compounds of the general formula:

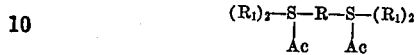

wherein R stands for an aliphatic radicle containing at least 10 carbon atoms, $R_1$ stands for a methyl, ethyl or benzyl-group and Ac means an acid anion such as

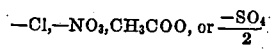

Such disulphonium compounds are obtainable by various methods.

In a simple manner one may start from the corresponding disulphides and treat these disulphides with agents capable of being added such as dimethyl sulphate, diethyl sulphate, benzyl chloride, chloracetone or ω-bromacetophenone, whereby salts of sulphonium compounds are formed.

When starting for instance from olein alcohol, adding hydrobromic acid thereto and heating the dibromoctadecane thus formed with an alcoholic hydrosulphide solution, for the most part a dimercapto compound is formed yielding for instance by treatment with dimethyl sulphate a disulphonium salt.

The disulphonium compounds obtained according to the present invention are dark colored semisolid resinous substances, more or less soluble in water. Their solutions are resistant in a neutral, acid or alkaline medium; they foam and are resistant towards hard water. They have a wetting, emulsifying and dispersing effect, for instance towards lime soaps.

Generally dyeings obtained on cellulosic material by means of substantive dyestuffs, when aftertreated with solutions of the present disulphonium compounds, are substantially improved as regards fastness to water, perspiration and washing. The latter fastness may be increased in many cases by aftertreatment with formaldehyde. The fastness to light is likewise increased.

On likewise after treating with solutions of the present disulphonium compounds wool goods which have been dyed with acid dyestuffs, their resistance towards alkaline fulling is increased.

The effect of the present disulphonium compounds may be partly due to their affinity, particularly for vegetable fibers.

In the artificial silk and wool dyeing industries they may be used as reserving agents.

In order to further illustrate our invention the following example is given, the parts being by weight and all temperatures in degrees centigrade.

Example

A mixture of 33.5 parts of trichlorinated hard paraffin (cf. U. S. Patent 1,948,924), 38 parts of crystallized sodium sulphide and about 200 parts of alcohol of 95% strength is heated in an autoclave while stirring at about 125° for about 7 hours. Then the reaction mass is diluted with water, the oily reaction product is extracted with benzene, washed with water and the benzene is evaporated. The formed disulphide derivative of paraffine remains as a yellow oil. 13 parts thereof are mixed with 15 parts of benzene and 6 parts of dimethylsulphate and the mixture is heated for about 2 hours to gentle boiling. When cool after the addition of a little quantity of aqueous ammonia in order to remove unchanged dimethylsulphate and after the evaporation of benzene the yellowish oily disulphonium compound is separated from the aqueous liquor and then neutralized with hydrochloric acid. In this form the disulphonium compound of the approximate formula:

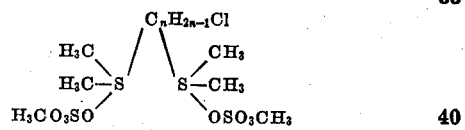

wherein $n$ represents numbers from about 20 to about 30, represents a paste like semisolid resinous mass, easily soluble in water.

When aftertreating dyeings, obtained on vegetable fibers by means of substantive dyestuffs with solutions of the aforesaid disulphonium base, the fastness thereof to water, perspiration and washing is substantially increased.

We claim:

1. Disulphonium compounds of high molecular weight of the general formula:

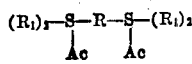

wherein R stands for an aliphatic radicle containing at least 10 carbon atoms, $R_1$ stands for a member of the group consisting of methyl, ethyl and benzyl group and Ac means an acid anion of the group consisting of

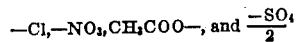

which compounds are dark colored semisolid resinous substances, soluble in water.

2. A disulphonium compound of the approximate formula:

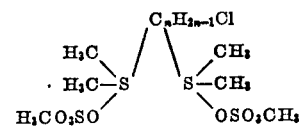

wherein $n$ represents numbers from about 20 to about 30, which represents a paste like semisolid resinous mass, easily soluble in water.

AUGUST CHWALA.
EDMUND WALDMANN.